(12) United States Patent
Pierce (10) Patent No.: US 11,927,173 B2
(45) Date of Patent: Mar. 12, 2024

(54) IMBALANCE ESTIMATION FOR THE WIND ROTOR OF A WIND TURBINE

(71) Applicant: Siemens Gamesa Renewable Energy A/S, Brande (DK)

(72) Inventor: Kirk Pierce, Lafayette, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/027,770

(22) PCT Filed: Sep. 10, 2021

(86) PCT No.: PCT/EP2021/074949
§ 371 (c)(1),
(2) Date: Mar. 22, 2023

(87) PCT Pub. No.: WO2022/069190
PCT Pub. Date: Apr. 7, 2022

(65) Prior Publication Data
US 2023/0340942 A1 Oct. 26, 2023

(30) Foreign Application Priority Data
Sep. 29, 2020 (EP) .................................... 20198948

(51) Int. Cl.
*F03D 13/35* (2016.01)

(52) U.S. Cl.
CPC .......... *F03D 13/35* (2016.05); *F05B 2260/78* (2013.01); *F05B 2260/966* (2013.01); *F05B 2270/334* (2013.01); *F05B 2270/404* (2013.01)

(58) Field of Classification Search
CPC ....... F03D 13/35; F03D 7/0296; G01H 1/006; G01M 1/22; F05B 2260/96; F05B 2260/966
See application file for complete search history.

(56) References Cited

U.S. PATENT DOCUMENTS 8,261,599 B2 * 9/2012 Jeffrey ................... G01H 1/006
73/66
10,480,486 B2 * 11/2019 Brødsgaard ........... F03D 7/0224
(Continued)

FOREIGN PATENT DOCUMENTS

| EP | 1978246 A1 | 10/2008 |
|---|---|---|
| ES | 2376815 A1 | 3/2012 |

OTHER PUBLICATIONS

PCT International Preliminary Report on Patentability dated Oct. 6, 2022 corresponding to PCT International Application No. PCT/EP2021/074949 filed Sep. 10, 2021.

*Primary Examiner* — Eldon T Brockman
(74) *Attorney, Agent, or Firm* — Schmeiser, Olsen & Watts LLP (57) ABSTRACT

A method for compensating an imbalance of a wind rotor of a wind turbine includes applying at least one test-offset to a parameter characterizing a state of the wind rotor, wherein the imbalance depends on the parameter; measuring for the at least one test-offset an acceleration of the wind turbine, wherein the acceleration depends on the imbalance; and determining a compensation-offset based on the measured acceleration, wherein the imbalance is at least partially compensated, when the compensation-offset is applied to the parameter. Furthermore, a corresponding wind turbine includes a control unit configured to carry out the above method.

14 Claims, 8 Drawing Sheets

(56) References Cited

U.S. PATENT DOCUMENTS

| | | | |
|---|---|---|---|
| 10,907,615 B2 * | 2/2021 | Pedersen | ............... F03D 7/0296 |
| 2009/0266160 A1 | 10/2009 | Jeffrey et al. | |
| 2012/0183399 A1 | 7/2012 | Perkinson | |
| 2018/0142676 A1 | 5/2018 | Pedersen | |

* cited by examiner

IMBALANCE ESTIMATION FOR THE WIND ROTOR OF A WIND TURBINE

CROSS-REFERENCE TO RELATED APPLICATIONS

This application claims priority to PCT Application No. PCT/EP2021/074949, having a filing date of Sep. 10, 2021, which claims priority to EP Application No. 20198948.0, having a filing date of Sep. 29, 2020, the entire contents both of which are hereby incorporated by reference.

FIELD OF TECHNOLOGY

The following in general relates to the technical field of wind turbines. Specifically, the following relates to a method for compensating an imbalance of a wind rotor as well as a wind turbine comprising a control unit configured to carry out such a method.

BACKGROUND

Many turbines operate with mass and pitch imbalances. The imbalance increases fatigue loading on the turbine and foundation. A balanced rotor reduces these fatigue loads reducing turbine and foundation costs.

Conventionally, an offline tool has been used to estimate mass imbalances. However, such a tool is not capable of pitch balancing and requires several hours of turbine operating data. Pitch calibrations are conventionally performed based on markings in the blade and hub or using a photographic method.

Accordingly, there may be a need for a fast and efficient method for compensating various imbalances of the wind rotor of a wind turbine as well as a need for a corresponding wind turbine having a control unit configured to carry out such a method.

SUMMARY

According to a first aspect of embodiments of the invention, a method for compensating an imbalance of a wind rotor of a wind turbine is described. The method comprises applying at least one test-offset to a parameter characterizing a state of the wind rotor, wherein the imbalance depends on the parameter. The method also comprises measuring for the at least one test-offset an acceleration of the wind turbine, wherein the acceleration depends on the imbalance. The method further comprises determining a compensation-offset based on the measured acceleration, wherein the imbalance is at least partially compensated, when the compensation-offset is applied to the parameter.

According to a further aspect of embodiments of the invention, a wind turbine for generating electrical power comprises a tower, a wind rotor, which is arranged at a top portion of the tower and which comprises at least one blade, and an electrical machine configured as an electric generator, which is mechanically coupled with the wind rotor. The wind turbine further comprises a control unit configured to carry out the method described herein.

In the context of the present application, a "wind turbine" is any device that is configured to convert wind energy into electrical energy, in particular for distribution to a grid and/or for local energy supply. A wind turbine may comprise a tower, a wind rotor, a nacelle, a shaft, in particular a low-speed shaft and/or a high-speed shaft, a gearbox, a generator, a brake assembly, a pitch drive, and/or a yaw drive. The wind rotor may be a rotor assembly and may comprise one or more blades and a central hub, to which the blades are attached. The wind rotor may comprise one, two, three, four, five or more than five blades. The wind rotor may further comprise a pitch bearing connecting the rotor hub with the blades. With the pitch bearing, an orientation of the blades may be adjustable, in particular a pitch angle determining an angle of attack of the blades.

An "imbalance" of the wind rotor may be any kind of asymmetry of the wind rotor, in particular an asymmetry that manifests itself during operation of the wind turbine, in particular during rotation of the wind rotor. An imbalance may be any asymmetry that deviates from the symmetry of the rotor defined by its rotational axis and/or the arrangement of the blades of the wind rotor. The imbalance may be a static or a dynamic asymmetry.

The imbalance may be a mass imbalance due to an asymmetric distribution of the rotor mass, in particular a distribution for which a center of gravity of the rotor does not lie on the rotational axis of the rotor. The mass imbalance may result from an inhomogeneous mass distribution in the blades, in particular from differing mass distributions of different blades of the wind rotor. The mass imbalance may be defined in terms of a virtual mass, in particular a virtual point mass, at a certain distance from the rotational axis of the wind rotor. This virtual mass may rotate at the same rotational velocity as the wind rotor.

The mass imbalance of the wind rotor may result for example from icing of the blades, from a loss of a blade tip or from manufacturing tolerances. The mass imbalance may result in a centrifugal force on the rotor corresponding to the rotating virtual mass. It may result in an oscillation of the wind turbine, in particular of the wind rotor, the nacelle and/or the tower of the wind turbine. The oscillation may have the same frequency as the rotating virtual mass and/or the wind rotor. The oscillation may be a side-to-side oscillation, but can for example also be a fore-aft oscillation.

The imbalance may be an aerodynamic imbalance due to an asymmetry in the aerodynamic properties of the wind rotor, in particular due to differences between the aerodynamic properties of different blades of the wind rotor. For example, the imbalance may be a pitch imbalance, where different blades differ in pitch, in particular have a different pitch angle. For example, the pitch angles of different blades may differ in the order of magnitude of 1°. The imbalance may also be due to a difference in form between different blades, e.g. a blade deformation, which may for example result from mechanical impact on the blade and/or wear of the blade. Furthermore, an aerodynamical imbalance may result from changes in surface characteristics of the individual blades, e.g. due to icing. In addition, the imbalance may at least partially result from asymmetries of components of the wind turbine other than the wind rotor, for example the shaft.

The aerodynamic imbalance may lead to asymmetric forces on the wind rotor, e.g. due to differences in the angles-of-attack of the different blades and/or due to differences in the blade profiles. This force imbalance may lead to an oscillation of the wind turbine, in particular of the wind rotor, the nacelle and/or the tower of the wind turbine. The frequency of the oscillation may correspond to the rotational frequency of the wind rotor. The oscillation may in particular be a fore-aft oscillation, but can for example also be a side-to-side oscillation.

The imbalance may be a moment imbalance, e.g. measured in kg*m. The moment imbalance may capture a magnitude of a mass imbalance and/or of an equivalent pitch imbalance. It may capture a magnitude of an overall imbalance. A corresponding phase imbalance may be associated with the moment imbalance.

A "parameter characterizing a state of the wind rotor" may be any property or characteristic of the wind rotor. It may be a property of the wind rotor, which is changeable, in particular which is controllable. The parameter may be changeable and/or controllable by an operating person and/or by a control unit of the wind turbine. The parameter may be changeable and/or controllable during operation of the wind turbine, in particular during energy production. In addition or alternatively, it may be changeable and/or controllable, when the wind turbine is out of operation, e.g. during maintenance or repair of the wind turbine. The parameter may be controllable in order to determine the energy yield of the wind turbine.

The parameter may for example be a mass distribution of the wind rotor, in particular a mass distribution of the blades. The parameter may denote the presence of one or more balance blocks or the absence of balance blocks on each of the blades of the wind turbine, in particular balance blocks at a predetermined distance from the rotational axis of the wind rotor. Such a balance block may for example have a mass of 18 kg. The parameter may denote the presence of one or more balance blocks of variable mass at variable distances from the rotational axis of the wind turbine.

In addition or alternatively, the parameter may refer to aerodynamical properties of the wind rotor. For example, the parameter may denote a pitch angle of each of the blades of the wind turbine. Alternatively or additionally, the parameter may denote a geometrical profile of each of the blades of the wind turbine. Further alternatively or additionally, the parameter may denote surface properties of each of the blades of the wind rotor, e.g. a surface roughness distribution over each of the blades of the wind rotor.

The parameter may be a scalar quantity, a vector quantity or a higher-dimensional quantity such as a matrix or a tensor. The parameter may comprise several subparameters, for example each characterizing a different blade of the wind rotor. Each subparameter may itself be a scalar quantity, a vector quantity or a higher-dimensional quantity such as a matrix or a tensor. The parameter may be time-dependent, for example time-dependent in a periodic manner, where the period may be determined by the rotation of the wind turbine.

An "offset" of a parameter may be a difference added to the parameter. The difference may be positive, negative and/or zero. The difference may be defined with respect to a base value of the parameter. The base value may be any value of the parameter used for comparison. The base value may correspond to a current value of the parameter or to a previous value of the parameter. The base value may correspond to a value of the parameter which is calculated or modeled, e.g. by a control unit of the wind turbine depending on conditions like wind speed, wind direction and/or desired energy yield. The base value may be determined by a mode of operation of the wind turbine, in which the imbalance of the wind rotor is not compensated. The base value may be determined with respect to a baseline operation of the wind turbine, in which standard operational procedures are employed which are not adapted to a specific wind turbine, e.g. not adapted to manufacturing tolerances or differences due to wear of the wind turbine.

Here, the terms value and difference may be understood in a general sense as referring to scalar, vector or even higher-dimensional quantities in accordance with the nature of the parameter. Each of the vector components or matrix entries may be negative, positive and/or equal to zero. Furthermore, the terms value and difference may refer to the values and differences of different subparameters of the parameter, e.g. subparameters characterizing the different blades of the wind rotor.

The offset may be a difference that is deliberately introduced, for example by a maintenance person and/or by a control unit configured to control the state of the wind rotor. The offset may be constant or it may vary with time, in particular periodically vary with a period determined by the rotational period of the wind rotor.

A "test-offset" of the parameter can be any offset that is applied to the parameter. The test-offset may be applied for testing and/or data collection purposes. The test-offset may correspond to an imbalance of the wind rotor that is deliberately introduced. The test-offset may be applied to examine or map the reaction of the wind turbine to changes of the parameter, in particular to examine changes of the imbalance in dependence of the parameter.

The test-offset may comprise individual pitch angle offsets for each blade of the wind rotor. Alternatively or in addition, the test-offset may comprise individual balance masses attached to each blade of the wind rotor. The test-offset may be zero and/or the test-offset may differ from zero. For example, the test-offset, in particular a mass test-offset, may comprise the absence of balance masses. The at least one test-offset may be one, two, three, four, five, six, more than six, nine, more than nine, twelve or more than twelve test-offsets, which may be applied one after the other. The at least one test-offset may be at least two test-offsets, which may be applied one after the other.

A "compensation-offset" of the parameter can be any offset that is applied to the parameter. The compensation-offset may be applied for compensation purposes, e.g. to at least partially compensate an imbalance of the wind turbine. The imbalance may be at least partially compensated, if any wear of the wind turbine due to the imbalance is reduced and/or if a loss in energy yield of the wind turbine due the imbalance is reduced. The imbalance may be at least partially compensated, if a measure of the imbalance is reduced. For example, the imbalance may be at least partially compensated, if a corresponding acceleration of the wind turbine is reduced or if the magnitude of a corresponding oscillation of the wind turbine is reduced.

Specifically, a mass imbalance may be at least partially compensated if the virtual mass characterizing the mass imbalance is reduced and/or if the virtual mass is moved closer to the rotational axis. As another example, an aerodynamic imbalance may be at least partially compensated, if the aerodynamic properties of the different blades are adjusted with respect to each other. Aerodynamic imbalances may be compensated by pitch adjustment. A pitch imbalance, which may be regarded as a type of aerodynamic imbalance, may be at least partially compensated, if the blade angles of the different blades are better aligned with respect to each other.

The "acceleration" of the wind turbine may be an acceleration of any component of the wind turbine, for example the tower, the nacelle, but also the wind rotor. The acceleration may be measured by one or more accelerometers mounted to these components of the wind turbine. The acceleration may be measured with respect to an environment, in particular a foundation of the wind turbine. The acceleration may be an acceleration in three dimensions, measured at one or more locations of the wind turbine, or it may comprise one or more components of the three-dimensional acceleration at these one or more locations, e.g. a component parallel to a plane or to a given direction. Specifically, the acceleration may comprise or be a fore-aft acceleration of the wind turbine. Alternatively or additionally, the acceleration may comprise or be a side-to-side acceleration. Here the side-to-side acceleration may be defined as being perpendicular to a vertical axis of the tower, but parallel to the rotor plane of the wind rotor. The fore-aft acceleration may be defined as being perpendicular to the vertical axis of the tower and to the side-to-side acceleration of the tower. Alternatively, the fore-aft direction may be defined with respect to the rotor plane, in particular as being perpendicular to the rotor plane.

"Measuring an acceleration" may comprise sensing the acceleration using a sensor device such as an accelerometer. It may further comprise processing the sensed acceleration. For example, measuring the acceleration may comprise determining an oscillation, in particular a frequency of the oscillation. As another example, measuring the acceleration may comprise performing a Fourier analysis of the sensed acceleration. Measuring the acceleration for at least one test-offset may comprise measuring the acceleration with a zero test-offset, i.e. for the base value of the parameter.

Measuring the acceleration may comprise binning the acceleration over at least one, in particular several, rotations of the wind rotor. It may comprise binning the acceleration as a function of rotor azimuth. The acceleration may be binned over one, two, three, four, five, more than five, ten or more than ten rotations. Measuring the acceleration may comprise measuring the acceleration several times to determine a mean, a standard deviation and/or a confidence interval. It may comprise measuring the acceleration until the standard deviation and/or the confidence interval is below a predetermined value and/or up to a predetermined maximum number of times.

"Determining a compensation-offset" based on the measured acceleration may comprise calculating and/or modeling the compensation-offset based on the measured acceleration. The compensation-offset may be determined based only on the measured acceleration, i.e. without having to measure any further quantities. When determining the compensation-offset, further conditions or circumstances characterizing the wind turbine and/or an environment of the wind turbine may be taken into account, such as wind speed, wind direction and/or absolute values of the different blade pitch angles.

The method for compensating an imbalance of a wind rotor and the corresponding wind turbine as described above may be advantageous, since imbalances can lead to increased wear or fatigue loading of the wind turbine, in particular of various components of the wind turbine such as the blades, the blade pitch adjustment devices or the bearings of the drive train of the wind turbine. Thus, at least partially compensating imbalances may lead to a longer life span of the wind turbine, longer maintenance intervals and/or reduced tower and foundation costs, the latter due to a lower imbalance design limit.

Furthermore, the method and corresponding wind turbine may be advantageous, because the compensation-offset may be determined based only on acceleration measurements, in particular nacelle acceleration measurements and/or rotor azimuth measurements using standard turbine sensors. At the same time, the method may be capable both of pitch balancing and of calculating the balance masses required to balance the wind turbine. For example, optical measurements, e.g. of blade angles, or photographic analysis may not be required.

Relatedly, the method may be fast requiring only about an hour or less for the balancing procedure, whereas conventional procedures require several hours at least. Also, it may be possible to carry out the balancing procedure, in particular the pitch balancing procedure, online during operation of the wind turbine, in particular during energy production.

Applying at least one test-offset to a parameter characterizing a state of the wind rotor, wherein an imbalance depends on the parameter, may be advantageous to examine in detail the relationship between the parameter and the imbalance in order to determine with high accuracy the compensation offset. The test-offsets can be interpreted in terms of supplementary imbalances that are explicitly introduced in addition to existing imbalances of the wind rotor, in particular existing imbalances which are to be at least partially compensated. These supplementary imbalances allow to collect relevant information about the behavior of the wind turbine, which is not available if only the acceleration without test-offsets is measured. Due to this additional information, the determined compensation-offset will in general be more accurate and/or effective for compensating an imbalance compared with a compensation-offset, which is determined merely based on measured acceleration without test-offset.

According to an embodiment of the invention, determining the compensation-offset comprises determining, for each of the at least one test-offset, a frequency component of a frequency spectrum of the measured acceleration, in particular a magnitude and/or a phase of the frequency component.

Determining the frequency component may comprise performing a Fourier analysis of the measured acceleration. It may comprise applying a Fourier transform, e.g. a continuous and/or a discrete Fourier transform such as a fast Fourier transform, to the measured acceleration. It may comprise applying a Goertzel algorithm to the measured application. One frequency component may be determined for each of the at least one test-offsets. The frequency component may be the same for each of the at least one test-offset, i.e. correspond to the same frequency, in particular the 1P frequency, or it may be different for different ones of the at least one test-offset. More than one frequency component may be determined for at least one of the at least one test-offset.

Such an embodiment may be advantageous because the determined frequency component may correlate with an oscillation of the wind turbine which is measurable in terms of the acceleration. The oscillation of the wind turbine may be an oscillation which is at least partially determined, e.g. caused, by the imbalance of the wind turbine. The imbalance may manifest itself in one or a small number of oscillations of the wind turbine. Thus, the imbalance may be adequately examined based on only one or a small number of frequency components corresponding to these oscillations. The Goertzel algorithm may be particularly efficient for determining a single or a small number of frequency components of the measured acceleration.

According to an exemplary embodiment, determining the frequency component comprises repeatedly determining the frequency component until certain characteristics of the frequency component, in particular magnitude and phase or real and imaginary components, are known with a predetermined confidence interval. The frequency component may be repeatedly determined after a predetermined number of oscillations of the wind turbine and/or after a predetermined number of rotations of the wind rotor, for example ten rotations.

According to a further embodiment of the invention, frequencies of each of the frequency components are based on, in particular are equal to, a rotor frequency of the wind rotor. Thus, in particular the current rotor frequency. Thus, the frequency component may be the so-called 1P excitation or 1P frequency component. The rotor frequency may be any other frequency, for example a multiple of the rotor frequency or a fraction of the rotor frequency.

Such an embodiment may be advantageous, if for example the imbalance is due to a difference in the properties of one blade compared with the other blades. Such an imbalance is likely to result in oscillations of the wind turbine having the current rotor frequency. Such oscillations may be best analyzed by determining the frequency component corresponding to the rotor frequency.

According to a further embodiment of the invention, determining the compensation-offset comprises mapping each of the frequency components to a coordinate system, determining a center defined by each of the frequency components and calculating the compensation-offset based on the center.

The coordinate system may be a two-dimensional coordinate system. In particular, the coordinate system may be the complex plane and the frequency components may be complex numbers mapped onto the complex plane. The coordinate system may also be a one-dimensional coordinate system, a three-dimensional coordinate system, or even a coordinate system with more than three dimensions.

A single frequency component may be determined for each of the at least one test-offsets. The center may be defined as an average of each of the frequency components. The average may be a weighted average, in which different frequency components have different weights. They may also be ascribed the same weights. The center may be defined as a center of gravity of a geometric shape defined by each of the frequency components. The geometric shape may for example be a polygon, a triangle, a hexagon, a circle or an oval. Corners of the geometric shape may correspond to the frequency components. One or more, in particular all, of the frequency components may lie on a circumference or periphery of the geometric shape.

Calculating the compensation-offset based on the center may comprise calculating the compensation-offset based on at least one of a distance of the center from an axis of the coordinate system, a distance of the center from an origin of the coordinate system, the coordinates of the center, the distance of the center from one or more of the frequency components, an average distance of the center from one or more of the frequency components, an orientation of one or more of the frequency components, a circumference of the geometrical shape, and an orientation of the geometrical shape.

Such an embodiment may be advantageous because a simple and efficient procedure to determine the compensation-offset is provided. This procedure may allow the determination of the compensation-offset with high accuracy so that the imbalance is compensated to a large extent. Such a procedure may be particularly advantageous if combined with an adequate choice of test-offsets. For example, the test-offsets may be chosen in a manner that the frequency components exhibit a certain symmetry in the coordinate system and/or that they approximate a certain shape in the coordinate system.

According to a further embodiment of the invention, determining the compensation-offset comprises fitting a circle based on each of the frequency components and calculating the compensation-offset based on the circle.

A single frequency component may be determined for each of the at least one test-offsets. Fitting the circle based on each of the frequency components may comprise mapping the frequency components to a coordinate system, in particular a two-dimensional coordinate system. It may comprise fitting the circle using a least squares method, in particular a non-linear least squares method. It may comprise determining fitted frequency components each corresponding to a respective frequency component. The fitted frequency components may be positioned on the circumference of the circle, in particular at equal distance from each other. For example, there may be six fitted frequency components corresponding to six frequency components and the six fitted frequency components may be spaced apart from each other by 60° on the circumference of the circle.

Calculating the compensation-offset based on the circle may comprise calculating the compensation-offset based on at least one of a diameter of the circle, the coordinates of a center of the circle, an orientation of one or more of the frequency components, an orientation of one or more of the fitted frequency components. There may be at least three frequency components, in particular six frequency components, on the basis of which the circle is fitted.

Such an embodiment may be advantageous because a simple and efficient procedure to determine the compensation-offset is provided. This procedure may allow the determination of the compensation-offset with high accuracy so that the imbalance is compensated to a large extent. Such a procedure may be particularly advantageous if combined with an adequate choice of test-offsets. For example, the test-offsets may be chosen such that the frequency components approximate a circle, e.g. when mapped to a coordinate system.

According to a further embodiment of the invention, determining the compensation-offset comprises setting the compensation-offset to one of the at least one test-offset, in particular to a test-offset corresponding to the frequency component with the smallest magnitude. The at least one test-offset may comprise a test-offset of value zero and/or at least one non-zero test-offset.

Such an embodiment may be advantageous since it requires little modeling or calculation. Thus, it may be particularly suited for an online monitoring system and/or for compensating imbalances during the operation of a wind turbine, in particular during energy production. The embodiment may be particularly advantageous, if combined with an iterative procedure, in which a compensation-offset is determined based on a set of test-offsets and then a further compensation-offset is determined based on a set of further test-offsets. More iterations are possible and given a suitable choice of test-offsets and further test-offsets, some convergence of the overall compensation-offset may be expected.

According to a further embodiment of the invention, after determining the compensation-offset, the method further comprises applying the compensation-offset to the parameter; applying at least one further test-offset to the parameter, wherein each of the at least one further test-offset is smaller than a corresponding test-offset; measuring for the at least one further test-offset the acceleration of the wind turbine; and determining a further compensation-offset based on the measured acceleration. The imbalance may be compensated to a greater extent, when the further compensation-offset is applied to the parameter, compared to, when only the compensation-offset is applied to the parameter.

A further test-offset may be smaller than a corresponding test-offset, if the absolute value of the further test-offset is smaller, e.g. if the further test-offset and the test-offset are scalars or vectors. A further test-offset may be smaller than a corresponding test-offset, if at least one entry in a vector or a matrix describing the further test-offset is smaller than a corresponding entry for the test-offset. A further test-offset of a parameter may be smaller than a corresponding test-offset of the parameter, if a further test-offset of at least one subparameter of the parameter is smaller than a corresponding test-offset of the subparameter, in particular for all subparameters. Corresponding test-offsets may for example be determined by the sequence in which they are applied and/or by their relative similarity. In an alternative embodiment, it suffices that at least one of the at least one further test-offset is smaller than a corresponding test-offset.

After determining the further compensation-offset, the method may further comprise applying the further compensation-offset to the parameter. It may further comprise determining a third compensation-offset based on at least one third test-offset and applying the third compensation-offset and, optionally, determining a fourth compensation-offset based on at least one fourth test-offset and applying the fourth compensation-offset. The method may comprise any number of iterations for determining subsequent compensation-offsets, e.g. five, more than five, more than ten, or more than a hundred iterations. The number of iterations may be determined by a convergence of the overall compensation-offset and/or by a convergence to zero of the sequence of compensation-offsets. The overall compensation-offset may be defined as the sum of the sequence of compensation-offsets.

Such an embodiment may be advantageous since it requires little modeling and calculation. Thus, it may be particularly suited for an online monitoring system and/or for compensating imbalances during the operation of a wind turbine, in particular during power production.

According to a further embodiment of the invention, applying the at least one test-offset comprises sequentially applying a plurality of test-offsets, in particular in a temporal sequence. The plurality of test-offsets may be applied one after the other.

The plurality of test-offsets may consist of three test-offsets, more than three test-offsets, six test-offsets, more than six test-offsets, nine test-offsets, more than nine test-offsets. The number of test-offsets may be divisible by the number of blades of the wind rotor. In addition, there may be a test-offset of value zero.

Such an embodiment may be advantageous because a sequence of test-offsets may allow to adequately examine the behavior of the wind turbine when the imbalance is changed. This may allow the determination of the compensation-offset with high accuracy and to effectively compensate the imbalance.

According to a further embodiment of the invention, each of the plurality of test-offsets comprises a blade test-offset for each of a plurality of blades of the wind rotor, wherein the values of the blade test-offsets are permuted for different test-offsets and/or wherein signs, in particular all signs, of the values of the blade test-offsets are reversed for different test-offsets.

The plurality of test-offsets may comprise test-offsets, for which the values of the blade test-offsets are permuted, such that there are corresponding blade test-offsets for each of the plurality of blades. For example, in the case of three blades, there may be corresponding test-offsets (a,b,b), (b,a,b), and (b,b,a), where the first entry denotes the blade offset of the first blade, the second entry the blade offset of the second blade, and the third entry the blade offset of the third blade, respectively. Similarly, regarding sign reversal, there may be corresponding test-offsets (a,b,c) and (−a,−b,−c), wherein the values a, b, c may be positive, negative or zero.

Such an embodiment may be advantageous, because it allows to systematically examine, how the behavior of the wind turbine depends on the imbalance. This may allow the determination of the compensation-offset with high accuracy and to effectively compensate the imbalance. The symmetric choice of the test-offsets involving permutation and/or sign reversal may be reflected when corresponding frequency components are mapped to a coordinate system. Thus, the above embodiment may be especially advantageous, when the compensation-offset is determined based on a center of the frequency components and/or based on a fitted circle.

According to an exemplary embodiment, the number of test-offsets is a multiple of the number of blades of the wind rotor, in particular a multiple of twice the number of blades of the wind rotor. This embodiment may reflect the symmetric choice of test-offsets as described above, where the factor two results, when requiring pairs of test-offsets with sign reversal.

According to an exemplary embodiment, the sum of the values of the blade test-offsets is zero for at least one, in particular all, of the at least one test-offset. This may be advantageous for introducing test-offsets in a particularly balanced or symmetrical manner.

According to an exemplary embodiment, the compensation-offset is a blade compensation-offset and the method further comprises applying the blade compensation-offset and determining a mass compensation-offset, while the blade compensation-offset is applied.

According to a further embodiment of the invention, the parameter comprises a plurality of blade parameters, each characterizing a different blade of a plurality of blades of the wind rotor, wherein each blade parameter comprises a blade pitch and/or a blade balance mass of the respective blade. The blade balance mass may be determined by a number and/or a mass of balance blocks which are attached to the respective blade. Different balance blocks may differ in mass or the mass of all balance blocks may be the same. The balance blocks may be attachable to the respective blade at a variable distance from the rotational axis of the wind rotor or they may be attachable only at a fixed distance from the rotational axis. A mass of an individual balance block may for example be between 5 kg and 50 kg, in particular between 10 kg and 20 kg.

Such an embodiment may be advantageous because both blade pitch and blade balance mass are suitable parameters for compensating imbalances of a wind rotor. For example, blade balance mass may be suitable to compensate a mass imbalance of the wind rotor and blade pitch may be suitable to compensate an aerodynamical imbalance and/or a mass imbalance of the wind rotor.

According to a further embodiment of the invention, at least one test-offset comprises a blade pitch test-offset with an absolute value between 0.05 and 2 degrees, in particular between 0.1 and 1 degrees, in particular between 0.3 and 0.6 degrees.

Such an embodiment may be advantageous, because blade pitch test-offsets of the described order of magnitude may be large enough to cause a notable excitation, but small enough not to lead to substantial load issues.

According to a further embodiment of the invention, the acceleration comprises a fore-aft acceleration and/or a side-to-side acceleration of a tower of the wind turbine and/or of a nacelle of the wind turbine.

The side-to-side acceleration may be defined as being perpendicular to a vertical axis of the tower, but parallel to the rotor plane of the wind rotor. The fore-aft direction may be defined as being perpendicular to the vertical axis of the tower and perpendicular to the side-to-side acceleration of the tower. Alternatively, the fore-aft direction may be defined with respect to the rotor plane, in particular as being perpendicular to the rotor plane. When measuring the acceleration, deviations from these directions may be possible, e.g. by 15 degrees or less, in particular by 5 degrees or less, in particular by 1 degree or less.

Such an embodiment may be advantageous because these accelerations and corresponding oscillations may correlate well with the imbalance, which is to be reduced.

According to a further embodiment of the invention, the imbalance comprises an aerodynamical imbalance, which is compensated based on the fore-aft acceleration, and the imbalance comprises a mass imbalance, which is compensated based on the side-to-side acceleration. The aerodynamical imbalance may be a pitch imbalance.

The aerodynamical imbalance, in particular the pitch imbalance, may be compensated first and the mass imbalance may be compensated second or vice versa. For large mass imbalances, several iterations may be necessary, e.g. iterations of pitch balancing and mass balancing or only iterations of mass balancing. Pitch balancing may compensate at least partially for a mass imbalance.

Such an embodiment may be advantageous, because the fore-aft acceleration, in particular fore-aft oscillations, may correlate with the aerodynamical imbalance and the side-to-side acceleration, in particular side-to-side oscillations, may correlate with the mass imbalance.

According to a further embodiment of the invention, the compensation-offset is determined in dependence of a blade pitch angle of the wind rotor, in particular an absolute blade pitch angle of the wind rotor, and/or in dependence of a blade loading of the wind rotor. The blade pitch angle may be one of the pitch angles of the blades of the wind rotor or may be an average of all pitch angles of the blades.

Such an embodiment may be advantageous for an efficient compensation of the imbalance, in particular when the imbalance depends on the current blade pitch angle.

According to an exemplary embodiment, the method is carried out during operation of the wind turbine, in particular during power production.

BRIEF DESCRIPTION

Some of the embodiments will be described in detail, with reference to the following figures, wherein like designations denote like members, wherein.

DETAILED DESCRIPTION

The illustrations in the drawings are schematic. In different drawings, similar or identical elements are provided with the same reference signs. For the sake of clarity and comprehensibility, reference signs are sometimes omitted for those features, for which reference signs have already been provided in earlier figures.

Before, referring to the drawings, exemplary embodiments will be described in further detail, some basic considerations will be summarized based on which exemplary embodiments of the invention have been developed.

The method developed can be used to aerodynamically balance the pitch of any wind turbine and then calculates the mass to be added to the rotor to achieve mass balance. A monitor (control unit) using the mass balance calculation method operates continuously to monitor the balance of the rotor. This monitor can be used to detect imbalances due to any reason, such as icing, poorly balanced rotor, loss of blade tip, etc.

The method applies a series of six pitch test-offsets with the turbine rotor rotating at a selected speed. A Goertzel filter is used to determine the magnitude and phase (or real and imaginary components) of the 1P excitation (frequency component) from the nacelle acceleration binned as a function of rotor azimuth over several rotations. For pitch balancing the tower fore-aft acceleration is used. Once the sequence of six pitch test-offsets is complete, which is determined by checking the confidence interval, the resulting data points form a circle in the complex plane. A circle is fit to the data using a non-linear least squares method. Six data points on the circle with a 60° spacing are then fit to the data using a different non-linear least squares method.

From the pitch test-offset used in the pitch sequence, the diameter of the circle, and the orientation of the data points, the pitch compensation-offsets needed to aerodynamically balance the rotor can be calculated. With the pitch compensation-offsets applied, the mass compensation-offset required to balance the rotor is calculated using the nacelle side-to-side acceleration. There is a strong coupling between aerodynamic imbalance and mass imbalance, and so for a large mass imbalance multiple balancing iterations may be needed.

The method could be used during normal turbine operation. The pitch compensation-offsets can be calculated as a function of the pitch angle of the turbine and scheduled as a function of the pitch angle to maintain tight balancing tolerances for all turbine operating conditions. Rotor imbalance has been observed to be dependent on the pitch angle of the turbine.

As an alternative to the direct calculation of the pitch compensation-offsets required to balance the rotor, an iterative method could be used based on the same 1P data collection method. For this method the baseline condition without pitch test-offsets and the six pitch test-offset cases are evaluated and the case with the lowest 1P excitation is selected. The lowest 1P excitation could be the case with no test-offsets or one of the six test-offsets in a sequence. The condition with the lowest 1P excitation now becomes the baseline and the magnitude of the pitch test-offset used in the sequence is reduced resulting in further pitch test-offsets. The sequence of six further pitch test-offsets is applied and again the case with the lowest excitation is selected. The process is continued until the method converges. A lower limit on the pitch test-offset magnitude would be used to provide some difference in the excitation.

An advantage of the above method is the use of data from a sequence of pitch test-offsets that can be used to calculate the pitch compensation-offsets required for balancing. Also of importance is the use of multiple calculations to estimate convergence and calculation of the average over several rotor revolutions. Once the pitch compensation-offsets are calculated the values are held for the calculation of the mass required to balance the rotor. The fore-aft acceleration is used for pitch balancing and the side-to-side acceleration is used for mass balancing. The method described here requires only a standard turbine nacelle acceleration measurement and is capable of pitch balancing and calculation of the mass required to balance the wind turbine rotor.

Figure 1:
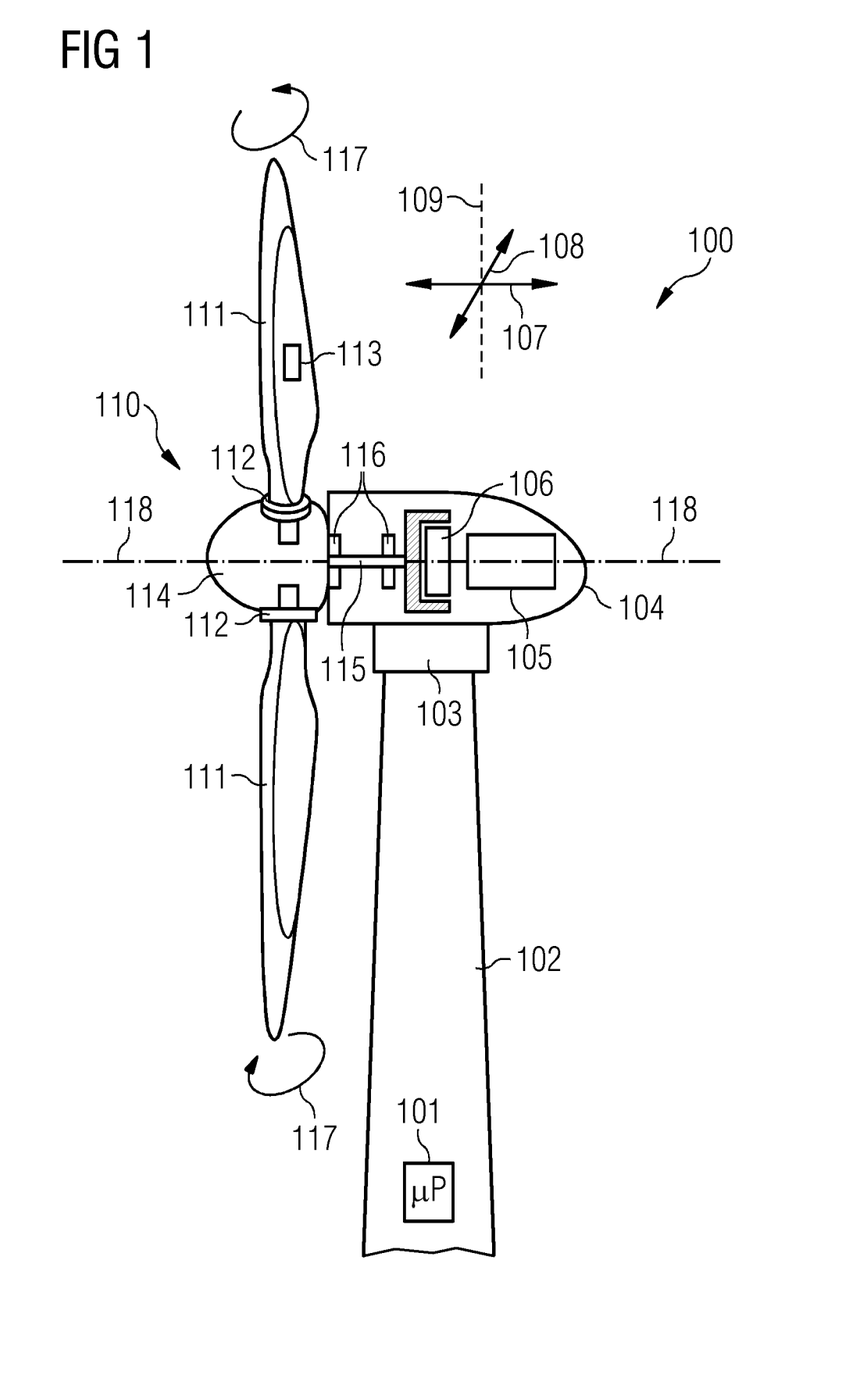
FIG. 1 shows a wind turbine with a control unit according to an exemplary embodiment of the invention.

FIG. 1 shows a wind turbine 100 comprising a tower 102, which is mounted on a non-depicted fundament. The tower 102 is aligned with a vertical axis 109. On top of the tower 102, a nacelle 104 is arranged. Between tower 102 and nacelle 104, a yaw angle adjustment device 103 is provided which can be controlled to "yaw" the nacelle 104 for alignment with the current wind direction.

The wind turbine 100 further comprises a wind rotor 110 having three blades 111. In FIG. 1, only two of these blades 111 are visible. The wind rotor 110 is rotatable around a rotational axis 118. The blades 111, which are mounted at a hub 114, extend radially from the rotational axis 118.

Between the hub 114 and each one of the blades 111, a respective blade adjustment device 112 is provided to adjust the blade pitch angle 117 of each blade 111 by rotating the respective blade 111 around an axis, which is substantially parallel to the longitudinal extension of the blade 111. By controlling the blade adjustment device 112 the blade pitch angle 117 of the respective blade 111 can be adjusted in such a manner that, at least under normal wind conditions, a maximum wind power can be retrieved from the presently available wind power. However, the blade pitch angle can also be intentionally adjusted to a position, in which only a reduced wind power is captured.

Within the nacelle 104, an electric generator 100 is provided comprising a stator assembly and a rotor assembly. The wind rotor 110 is rotationally coupled with the rotor assembly by means of a drive train realized as a rotatable shaft 115. A schematically depicted bearing assembly 116 is provided in order to hold in place both the wind rotor 110 and the rotor assembly. As can be seen in FIG. 1, the shaft 115 extends along the rotational axis 118. In order to provide an AC power signal being synchronized with a power signal of a utility grid the electric output of the stator assembly 110 is electrically connected to a power converter 105.

The wind turbine 100 further comprises a control unit 101 for operating the wind turbine 100 in a highly efficient manner. The control unit 101 may be located within the wind turbine 100 or outside the wind turbine 100. Apart from controlling for instance the yaw angle adjustment device 112, the control unit 101 is also used for adjusting the blade pitch angle 117 of the blades 111 of the wind rotor 110 in an optimized manner.

The control unit is configured to carry out a method for compensating an imbalance of a wind rotor 110 of a wind turbine 100. The method comprises applying at least one test-offset to a parameter characterizing a state of the wind rotor 110, wherein the imbalance depends on the parameter. The method also comprises measuring for the at least one test-offset an acceleration of the wind turbine 100, for example an acceleration along the fore-aft direction 107 and/or an acceleration along a side-to-side direction 108, wherein the acceleration depends on the imbalance. The method finally comprises determining a compensation-offset based on the measured acceleration 107, 108, wherein the imbalance is at least partially compensated, when the compensation-offset is applied to the parameter. The test-offset and/or the compensation-offset may be applied by changing the pitch angles 117 of the blades 111 and/or by adding or removing balance blocks 113 of the blades 111.

Figure 2:
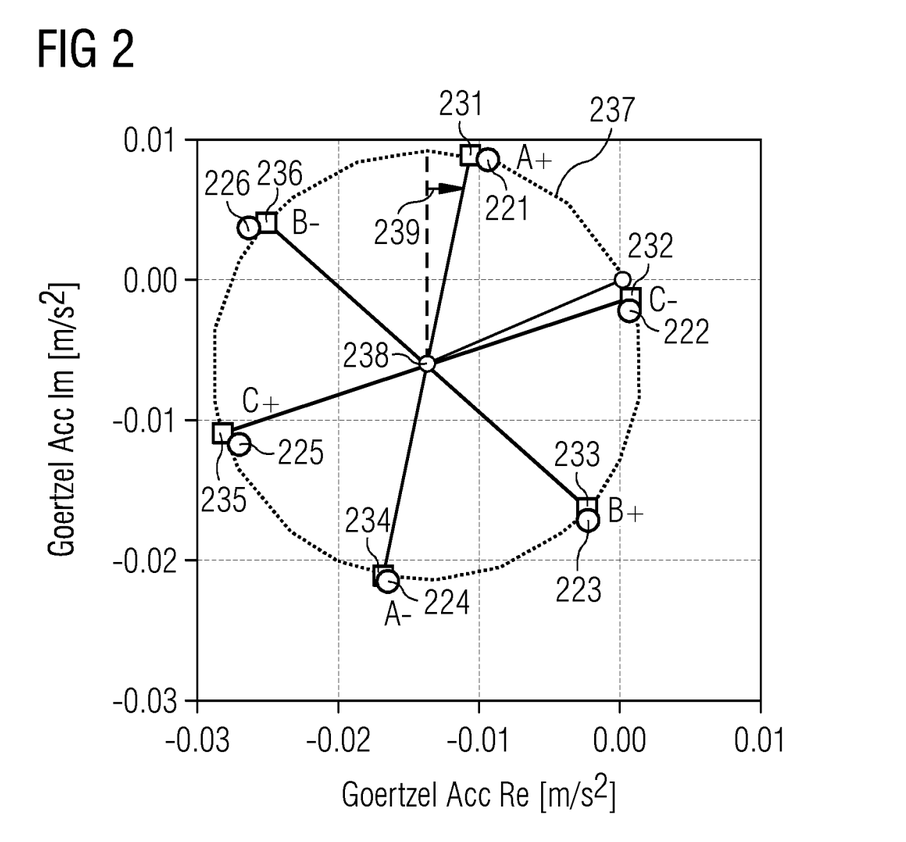
FIG. 2 shows a circle fitted to frequency components according to an exemplary embodiment of the invention.

FIG. 2 shows frequency components 221-226 mapped to a circle 237, wherein the circle 237 is used for a pitch balancing procedure. In this pitch balancing procedure, the following turbine operating conditions are applied. The turbine is offline with low winds in the order of magnitude of 4 m/s to 7 m/s. The rotor speed of the wind rotor is regulated with blade pitch, e.g. at nominal rotor speed.

Then, known pitch test-offsets are applied (e.g. 0.3,−0.15,−0.15). Fore-aft acceleration data is binned as a function of azimuth. Based on this data, acceleration magnitude and phase of a respective frequency component 221-226 is calculated using a Goertzel filter each N (~10) revolutions until a desired confidence interval achieved or a maximum of allowed iterations is reached.

Based on this procedure, data is collected for positive and negative test-offsets for each blade, for example for the following six test-offsets:

| test-offset blade A | test-offset blade B | test-offset blade C | Goertzel magnitude | Goertzel phase |
|---|---|---|---|---|
| 0.3 | −0.15 | −0.15 | 0.0128 | 311.8 |
| −0.3 | 0.15 | 0.15 | 0.0271 | 217.9 |
| −0.15 | 0.3 | −0.15 | 0.0171 | 188.1 |
| 0.15 | −0.3 | 0.15 | 0.0267 | 278.0 |
| −0.15 | −0.15 | 0.3 | 0.0296 | 246.6 |
| 0.15 | 0.15 | −0.3 | 0.0022 | 167.6 |

Each test-offset corresponds to a frequency component 221-226. Using Goertzel magnitude and Goertzel phase, i.e. the respective magnitude and phase of each of the frequency components 221-226, the frequency components 221-226 are mapped to a coordinate system.

Using non-linear least squares, the parameters of a circle 237 fitting the acceleration data are estimated. The circle 237 has a center 238. Based on a different non-linear least squares, six fitted frequency components 231-236 are determined using 60 degree offsets for each fitted frequency component 231-236, with an unknown rotation. This will decrease directional sensitivity. The six fitted frequency components 231-236 are located on the circumference of the circle 237.

From the fit of data points and the known pitch offsets used to generate data, the pitch compensation-offsets to center the circle are calculated, e.g. based on a Coleman transform from the non-linear least squares fit of the positive and negative pitch test-offsets. The pitch compensation-offsets can for example be calculated based on the following equations:

$$A_{tilt} = -y_{center} \text{pitch}_{check}/r_{circle}$$

$$A_{yaw} = -x_{center} \text{pitch}_{check}/r_{circle}$$

$$co_{pitchA} = \tfrac{2}{3} \cos \varphi A_{tilt} + \tfrac{2}{3} \sin \varphi A_{yaw}$$

$$co_{pitchB} = \tfrac{2}{3} \cos(\varphi+120°) A_{tilt} + \tfrac{2}{3} \sin(\varphi+120°) A_{yaw}$$

$$co_{pitchC} = \tfrac{2}{3} \cos(\varphi+240°) A_{tilt} + \tfrac{2}{3} \sin(\varphi+240°) A_{yaw}$$

Here, $r_{circle}$ is the radius of the circle 237, e.g. 0.0153, $x_{center}$ and $y_{center}$ are the coordinates of the center 238 of the circle 237, e.g. −0.01382 and −0.0061, respectively, $pitch_{check}$ is the magnitude of the pitch offset used to generate data, and $\varphi$ is determined by the orientation 239 of at least one of the fitted frequency components 231-236. Finally, $co_{pitchA}$, $co_{pitchB}$, $co_{pitchC}$ are the calculated pitch compensation-offsets.

The described method can be used at commissioning and can be activated periodically as a check. A periodic or continuous version applies positive and negative pitch test-offsets to each blade, selects the minimum 1P acceleration as the new pitch offset reference, then reduces the pitch test-offset magnitude and repeats the procedure.

Figure 3:
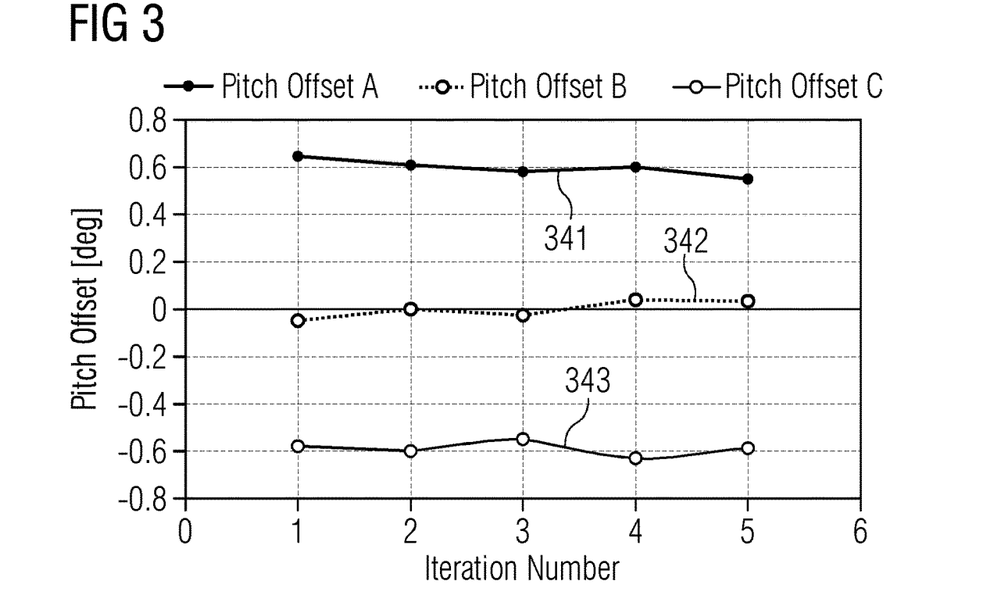
FIG. 3 shows pitch offsets.
Figure 4:
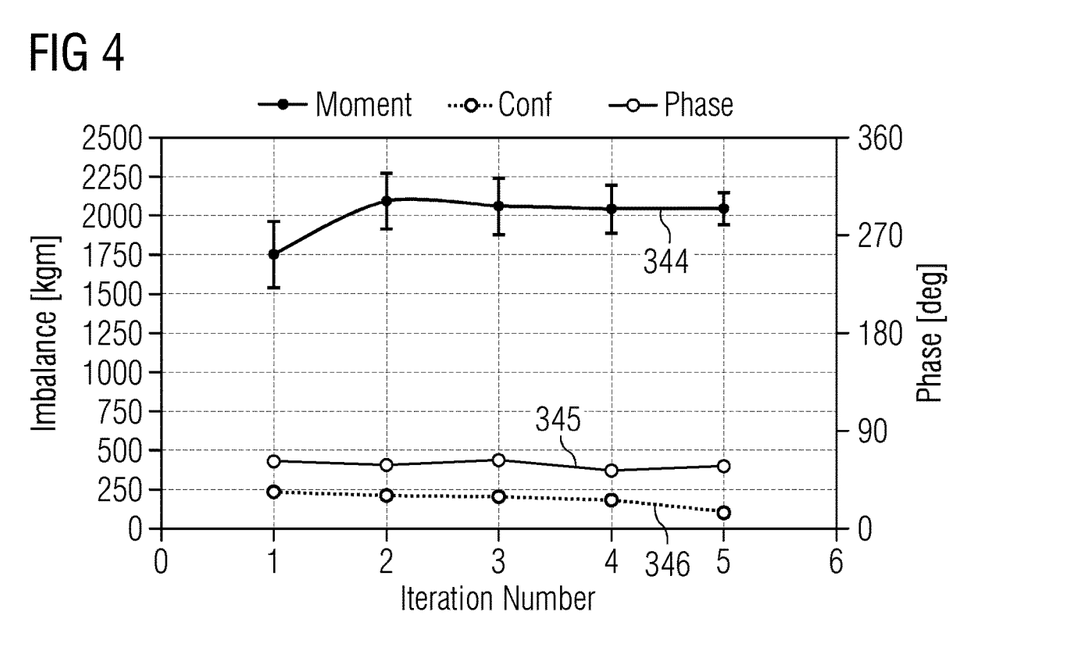
FIG. 4 shows corresponding imbalances according to an exemplary embodiment of the invention.

FIG. 3 shows blade pitch compensation-offsets 341-343 and FIG. 4 shows corresponding imbalances 344, 345, which have been at least partially compensated. FIGS. 3 and 4 show compensation calculations for a mass and pitch imbalance, which was purposely introduced for testing purposes. Specifically, balance blocks were shifted to create a mass imbalance, namely two balance blocks were removed from blade B and placed in blade A along with three additional balance blocks. Furthermore, a pitch offset has been applied, namely a +0.5° pitch imbalance-offset has been introduced on blade C.

To determine the blade pitch compensation-offsets 341-343, five pitch and mass balance tests were performed corresponding to an iteration number. FIG. 3 depicts the blade pitch compensation-offsets 341-343 in degrees in dependence of the iteration number. As can be seen, the pitch compensation-offsets 341-343, which were calculated by the method described herein, are consistent across the five tests. The calculated mean compensation-offsets 341-343 for pitch and mass are: 0.5980 for blade A, −0.005° for blade B, and −0.594° for blade C.

These compensation-offsets are plausible and consistent as can be shown when subtracting the compensation-offsets for only mass imbalance (determined as 0.474° for blade A, 0.167° for blade B and −0.333° for blade C) from the compensation-offsets for pitch and mass imbalance determined with respect to the present embodiment of FIGS. 3 and 4 yielding the difference: 0.124° for blade A, 0.200° for blade B, and −0.325 for blade C. These values are comparable to the values for a zero mean correction for +0.5° pitch imbalance-offset on blade C, i.e.: 0.167° for blade A, 0.167° for blade B and −0.333 for blade C.

FIG. 4 depicts a corresponding moment imbalance 344, measured in kg*m, and a corresponding phase imbalance 345, measured in degree, in dependence of the iteration number. The confidence interval 346 of the moment imbalance 344 is also depicted. The respective imbalances 344, 345 as depicted have already been at least partially compensated by applying the blade pitch compensation-offsets 341-343. A consistent pitch balance condition can be obtained. The magnitude mean of the moment imbalance 344 holding pitch offsets at values to balance pitch is 1984.0 kg*m.

Figure 5:
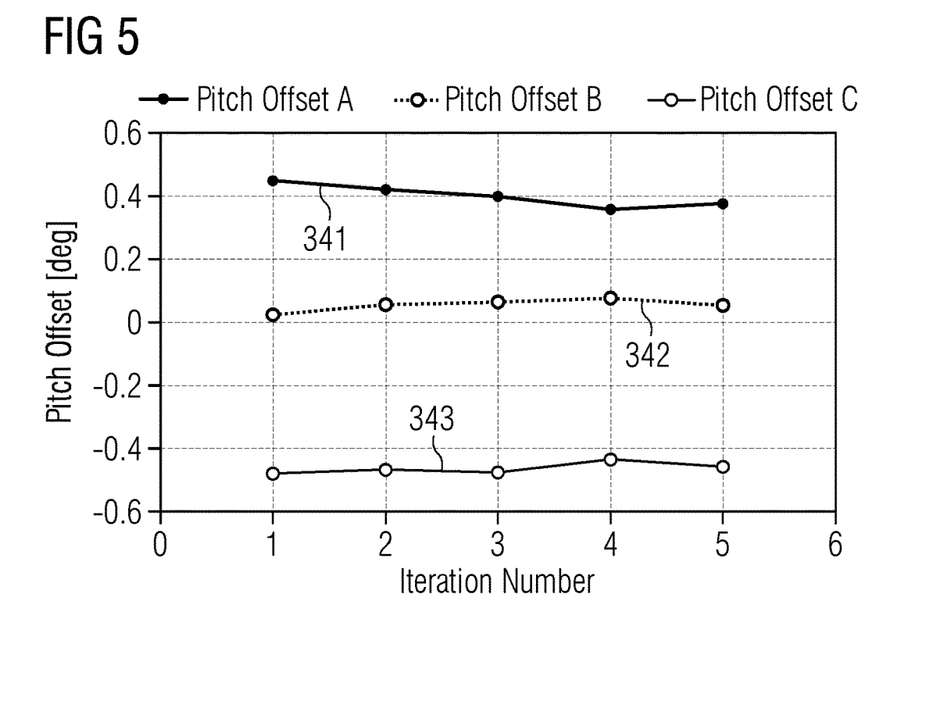
FIG. 5 shows pitch offsets.
Figure 6:
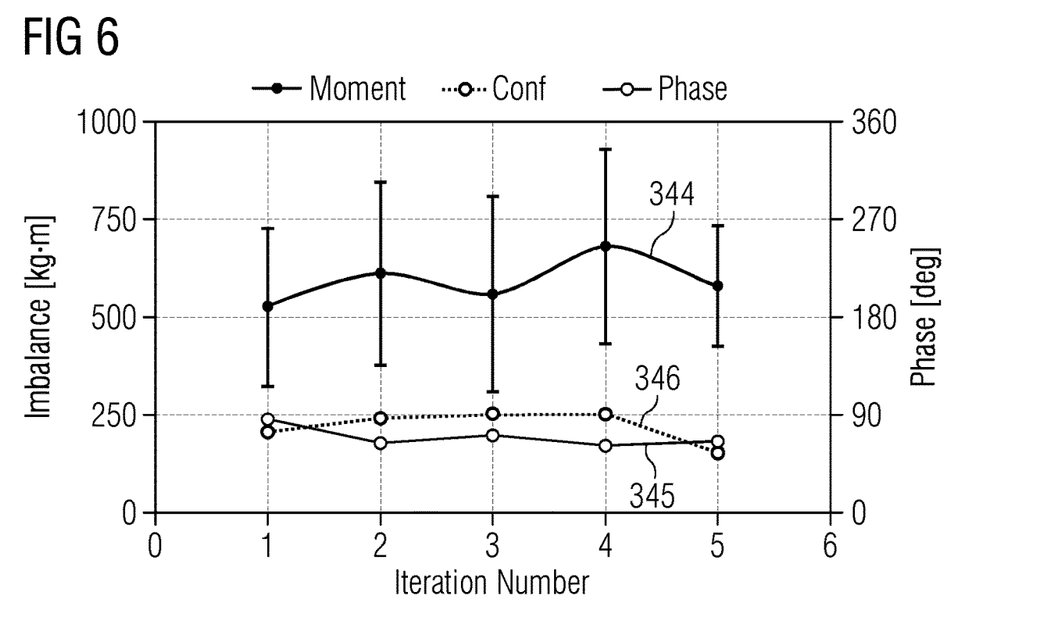
FIG. 6 corresponding imbalances according to an exemplary embodiment of the invention.
Figure 7:
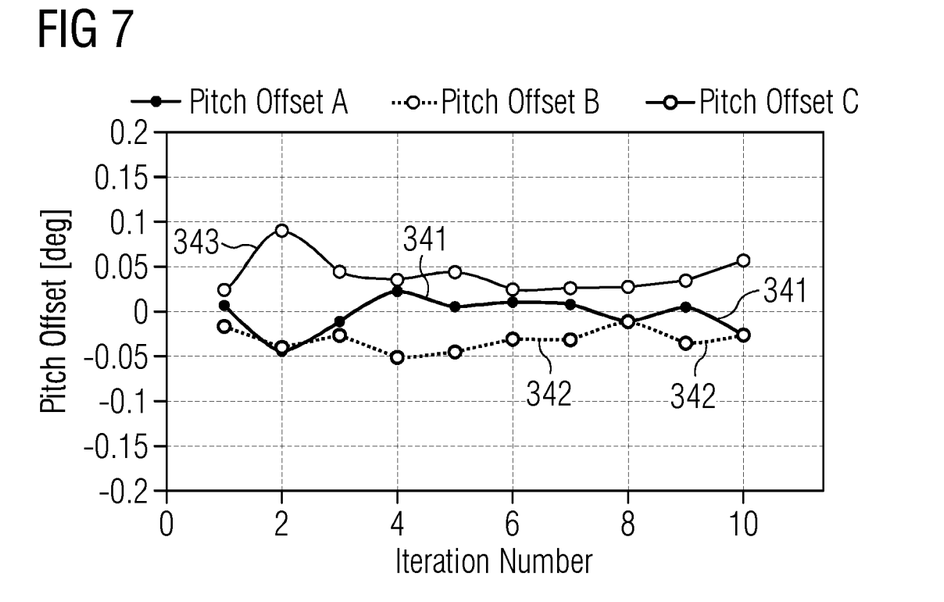
FIG. 7 shows pitch offsets.
Figure 8:
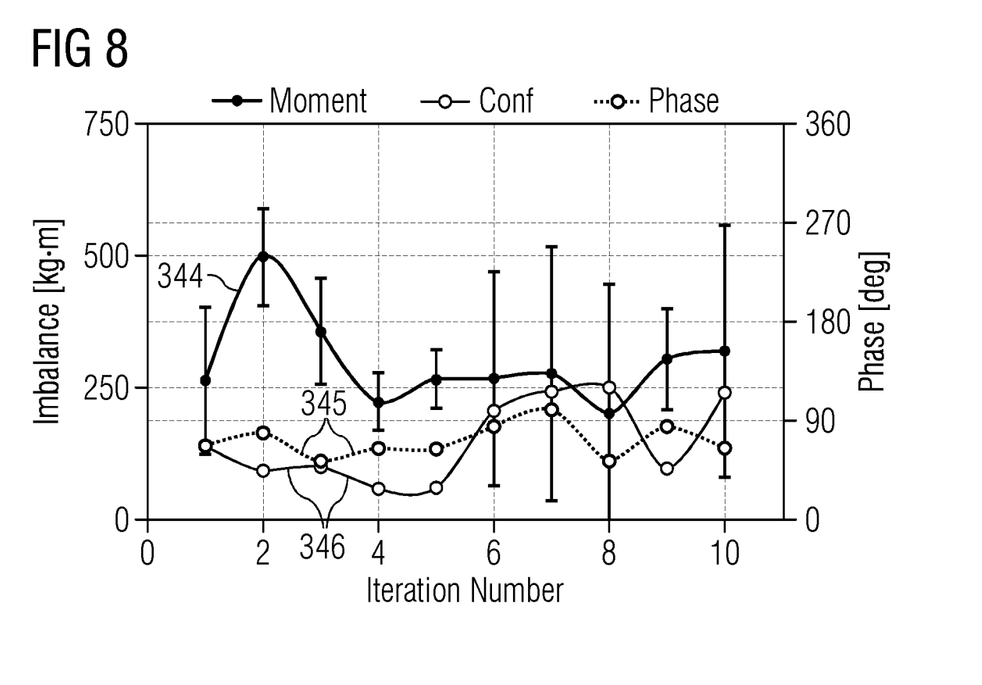
FIG. 8 corresponding imbalances according to an exemplary embodiment of the invention.

For general balancing, first, the pitch balance may be calculated by applying controllable test-offsets. The pitch compensation-offset may be applied to balance pitch and then the mass imbalance may be calculated. For a large mass imbalance, at least two iterations of rotor imbalance estimation may be required, inter alia because a large mass imbalance affects pitch balance calculations. Only mass is corrected on the first iteration. The first mass correction is calculated using data from mass and pitch imbalance data. The second mass correction is calculated using data from the first mass correction. At least in some cases, two iterations appear to be sufficient for pitch and mass corrections. FIGS. 3 and 4 illustrate rotor imbalance estimation during the first iteration. FIGS. 5 and 6 illustrate rotor imbalance estimation after the first iteration. FIGS. 7 and 8 illustrate rotor imbalance estimation after the second iteration.

FIG. 5 shows blade pitch compensation-offsets 341-343 and FIG. 6 shows corresponding imbalances 344, 345, which have been at least partially compensated. FIGS. 5 and 6 illustrate rotor imbalance estimation after the first iteration of rotor imbalance estimation with only mass compensation, as illustrated in FIGS. 3 and 4.

To determine the blade pitch compensation-offsets 341-343, five pitch and mass balance tests were performed corresponding to an iteration number. FIG. 5 depicts the blade pitch compensation-offsets 341-343 in degrees in dependence of the iteration number. As can be seen, the pitch compensation-offsets 341-343, which were calculated by the method described herein, are consistent across the five tests. The calculated mean compensation-offsets 341-343 for pitch are: 0.4050 for blade A, 0.057° for blade B, and −0.463° for blade C.

FIG. 6 depicts a corresponding moment imbalance 344, measured in kg*m, and a corresponding phase imbalance 345, measured in degree, in dependence of the iteration number. The confidence interval 346 of the moment imbalance 344 is also depicted. The respective imbalances 344, 345 as depicted have already been at least partially compensated by applying the blade pitch compensation-offsets 341-343. A consistent pitch balance condition can be obtained. The magnitude mean of the moment imbalance 344 holding pitch offsets at values to balance pitch is 586.4 kg*m.

FIG. 7 shows blade pitch compensation-offsets 341-343 and FIG. 8 shows corresponding imbalances 344, 345, which have been at least partially compensated. FIGS. 7 and 8 illustrate rotor imbalance estimation after the second iteration of rotor imbalance estimation with second mass compensation and pitch compensation, as illustrated in FIGS. 5 and 6.

To determine the blade pitch compensation-offsets 341-343, ten pitch and mass balance tests were performed corresponding to an iteration number. FIG. 7 depicts the blade pitch compensation-offsets 341-343 in degrees in dependence of the iteration number. As can be seen, the pitch compensation-offsets 341-343, which were calculated by the method described herein, are consistent across the ten tests. The mean compensation-offsets 341-343 for pitch are: −0.0056° for blade A, −0.0323° for blade B, and 0.0388° for blade C. Thus, the pitch is well balanced.

FIG. 8 depicts a corresponding moment imbalance 344, measured in kg*m, and a corresponding phase imbalance 345, measured in degrees, in dependence of the iteration number. The confidence interval 346 of the moment imbalance 344 is also depicted. The respective imbalances 344, 345 as depicted have already been at least partially compensated by applying the blade pitch compensation-offsets 341-343. A consistent pitch balance condition can be obtained. The magnitude mean of the moment imbalance 344 holding pitch offsets at values to balance pitch is 295.3 kg*m. The mass imbalance is within one mass balance block tolerance.

Figure 9:
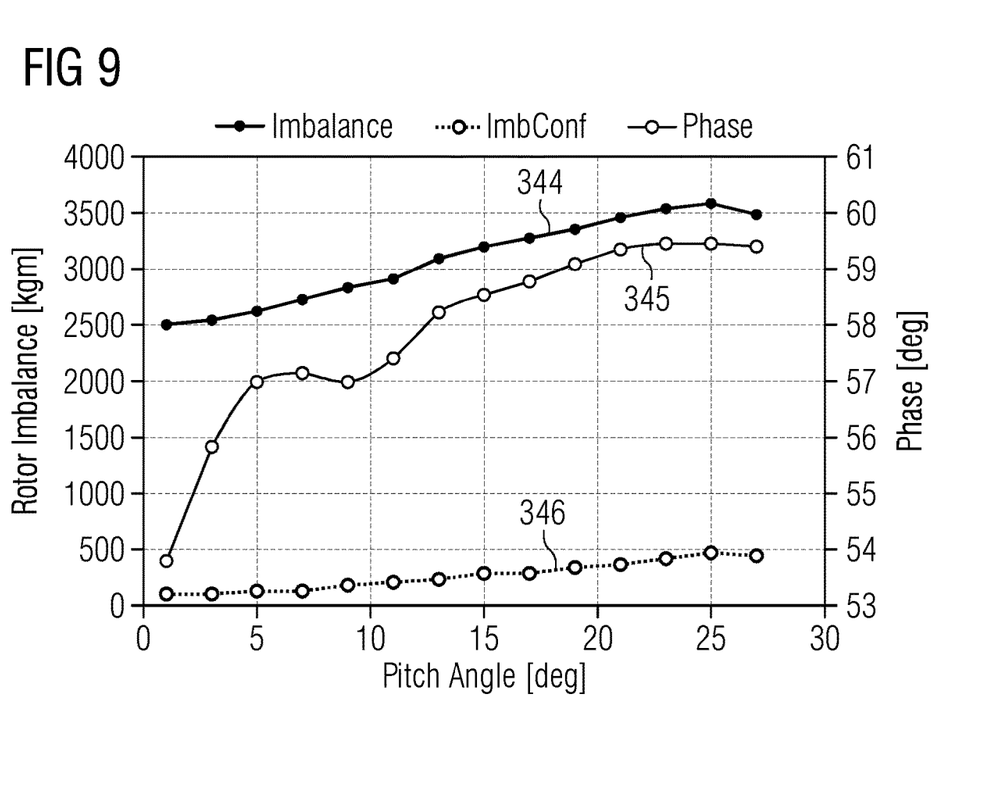
FIG. 9 shows a dependence between imbalance and pitch angle according to an exemplary embodiment of the invention.

FIG. 9 depicts moment imbalance 344 in kg*m and phase imbalance 345 in degree as well as the confidence interval of the moment imbalance 346 in dependence of the blade pitch angle of the wind rotor. As can be seen, the imbalances 344, 345 increase as a function of blade pitch angle. Thus, it may be necessary to calculate pitch compensation-offsets to balance the rotor as a function of blade pitch angle. Accordingly, the pitch compensation-offsets could be scheduled as a function of pitch to achieve tight balancing targets.

Figure 10:
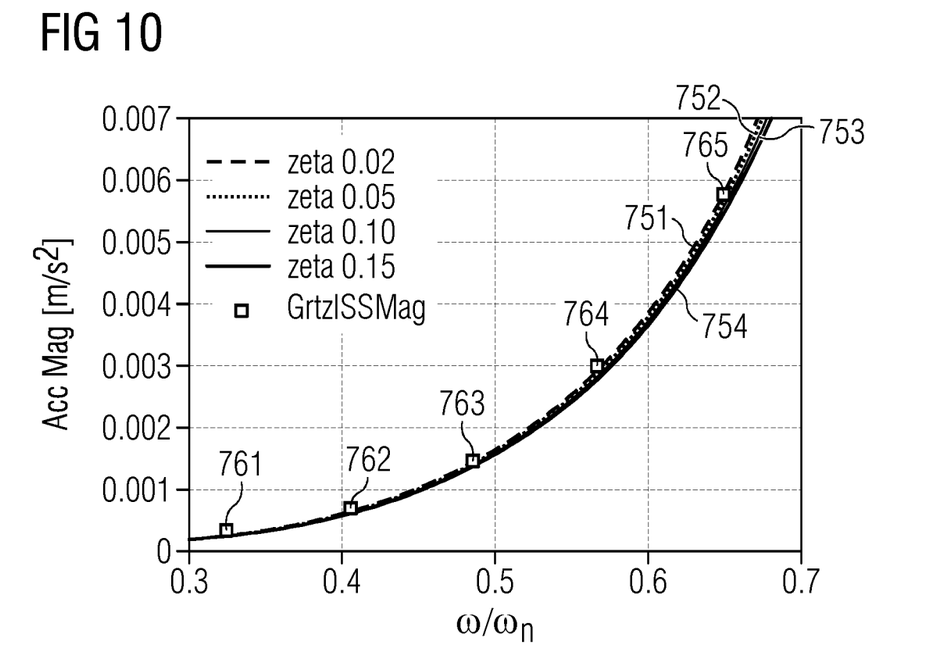
FIG. 10 shows frequency components in comparison with different damping curves according to an exemplary embodiment of the invention.
Figure 11:
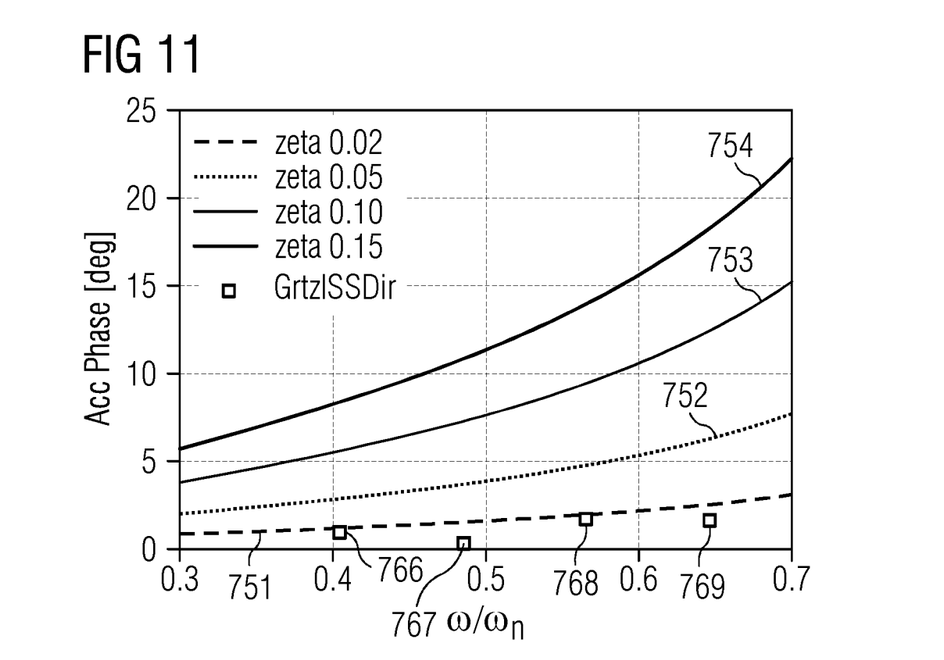
FIG. 11 shows frequency components in comparison with different damping curves according to an exemplary embodiment of the invention.

FIGS. 10 and 11 show simulated frequency components in comparison with damping curves 751-754 in order to determine a damping constant $\zeta$. In the embodiment of FIGS. 10 and 11, a mass asymmetry of 125 kg at 22.18 meter on one of the blades has been introduced. Each of the damping curves corresponds to a different damping constant $\zeta$, e.g. damping curve 751 to damping constant 0.02, damping curve 752 to damping constant 0.05, damping curve 753 to damping constant 0.10, and damping curve 754 to damping constant 0.15. Magnitude and phase of the frequency component are determined based on a Goertzel algorithm.

In FIG. 10, the magnitude 761-765 of a frequency component is shown in dependence $\omega/\omega_n$, where $\omega$ is the rotational frequency of the wind rotor and $\omega_n$ is the natural eigenfrequency of the tower. In the embodiment of FIGS. 10 and 11, $\omega_n$ is 0.265 Hz. The magnitudes 761-765 of the frequency components are compared with different damping curves 751-754. The magnitude follows consistently the damping curve 751 with a damping constant of 0.02.

In FIG. 11, the phase 766-769 of a frequency component is shown in dependence of $\omega/\omega_n$. The phases 766-769 correspond to the magnitudes 762-765, respectively. The phases 761-765 of the frequency components are compared with different damping curves 751-754. As in the case of the magnitude, the phase also follows quite well the damping curve 751 with a damping constant of 0.02.

Based on the determined damping constant, balance masses to be added to the blades of the wind turbine can be calculated to compensate a mass imbalance. For example, if the mass imbalance can be represented in terms of a virtual mass $M_{Rot}$ at a certain distance r from the rotational axis of the wind rotor and if the virtual mass is positioned in direction of one of the blades, balance masses to be added to the other blades can be calculated.

For example, if blade A is heavy, i.e. if $30°<\theta-\varphi\leq150°$, where $\theta-\varphi$ is the angle between the vertical axis of the wind tower and blade A, when the virtual mass is positioned at 90° from the vertical axis. Then, the masses to be added to blades B and C can be calculated as follows:

$$M_B=[\cos(90°-(\theta-\varphi))+\tfrac{1}{3}^{0.5}\sin(90°-(\theta-\varphi))]M_{Rot}r/R_{Bal}$$

$$M_C=[\cos(90°-(\theta-\varphi))-\tfrac{1}{3}^{0.5}\sin(90°-(\theta-\varphi))]M_{Rot}r/R_{Bal}$$

$M_{Rot}r$, i.e. the product of virtual mass and distance of the virtual mass from the rotational axis, can be calculated based on the damping constant $\zeta$ and the frequency of the wind rotor $\omega$.

Figure 12:
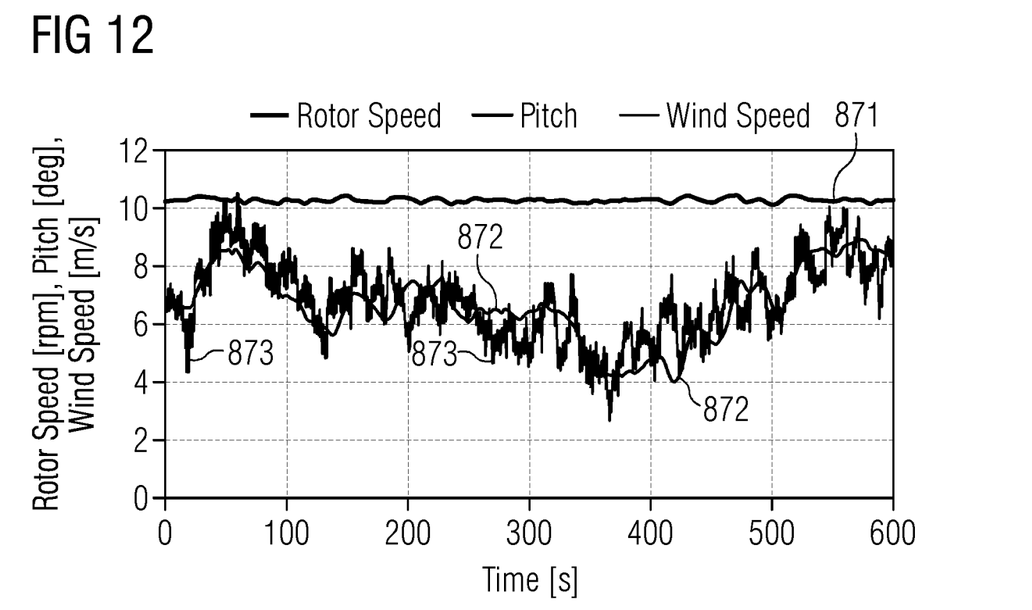
FIG. 12 shows rotor speed, blade pitch and wind speed.
Figure 13:
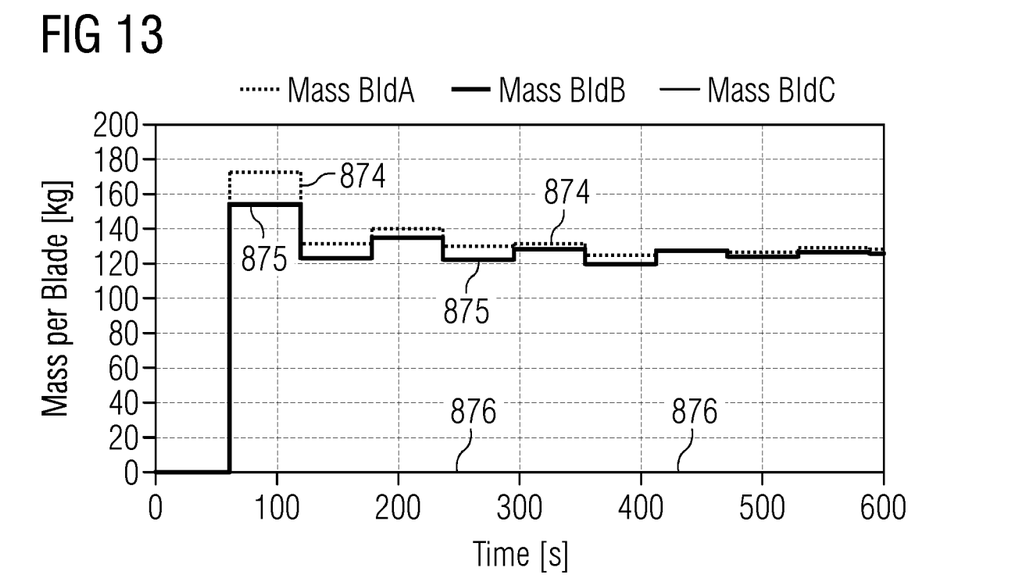
FIG. 13 shows corresponding balance masses of the blades according to an exemplary embodiment of the invention.

FIG. 12 shows rotor speed 871 in rpm, blade pitch 872 in degree and wind speed 873 in m/s in dependence of time in seconds. FIG. 13 shows corresponding balance masses 874-876 in kg also in dependence of time in seconds. Balance mass 874 is added to blade A, balance mass 875 is added to blade B, and balance mass 876 is added to blade C. Balance mass 876 of blade C is zero, because an imbalance with blade C heavy is compensated in the embodiment of FIGS. 12 and 13.

In the mass balancing procedure, the following operating conditions are applied. The turbine is offline with low winds in the order of magnitude of 4 m/s to 7 m/s. The rotor speed of the wind rotor is regulated with blade pitch, e.g. at nominal rotor speed.

Tower side-to-side acceleration data is binned as a function of azimuth. Acceleration magnitude and phase of a frequency component is calculated using a Goertzel filter each N (10) revolutions until a desired confidence interval is achieved or a maximum of allowed iterations is reached. Then balance masses to be added to each blade for balancing are calculated. For this, the tower side-to-side frequency and the tower head mass must be known and low damping ($\zeta=0.01$-$0.02$) must be assumed. As shown in FIG. 13, the determined balance masses 875, 876 for blades A and B converge after several calculations. Instead of calculating the individual balance masses per blade, the imbalance magnitude and direction could be calculated.

For overall balancing, i.e. pitch and mass balancing, one can start with pitch balancing since the pitch offsets can be controlled to estimate the pitch imbalance. The pitch offsets can be applied for aerodynamic balance. The mass required for balance can be calculated per mass balancing procedure. The pitch offsets required for aerodynamic balancing and the masses to add per blade for mass balancing can be reported or maintained in non-volatile memory.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for compensating an imbalance of a wind rotor of a wind turbine, the method comprising
   applying at least two test-offsets, one after the other, to a parameter characterizing a state of the wind rotor, wherein the imbalance depends on the parameter;
   measuring for the at least two test-offsets an acceleration of the wind turbine, wherein the acceleration depends on the imbalance; and
   determining a compensation-offset based on the acceleration, wherein the imbalance is at least partially compensated, when the compensation-offset is applied to the parameter, wherein determining the compensation-offset comprises;
      determining, for each of the at least two test-offsets, a frequency component of a frequency spectrum of the acceleration,
      mapping each of the frequency components to a coordinate system,
      determining a center defined by each of the frequency components, wherein the center is defined as a center of gravity of a geometric shape defined by each of the frequency components, and
      calculating the compensation-offset based on the center, wherein the parameter comprises a plurality of blade parameters, each characterizing a different blade of a plurality of blades of the wind rotor, wherein each blade parameter comprises a blade pitch.

2. The method of claim 1, wherein determining the compensation-offset comprises determining, for each of the at least two test-offsets, a magnitude and/or a phase of the frequency component of the frequency spectrum of the acceleration.

3. The method of claim 1, wherein frequencies of each of the frequency components are based on a rotor frequency of the wind rotor.

4. The method of claim 1, wherein determining the compensation-offset comprises fitting a circle based on each of the frequency components, and calculating the compensation-offset based on the circle, wherein the circle is fitted on a basis of at least three frequency components.

5. The method of claim 1, wherein determining the compensation-offset comprises setting the compensation-offset to a test-offset corresponding to the frequency component with the smallest magnitude.

6. The method of claim 1, wherein, after determining the compensation-offset, the method further comprises:
   applying the compensation-offset to the parameter;
   applying at least one further test-offset to the parameter, wherein each of the at least one further test-offset is smaller than a corresponding test-offset;
   measuring for the at least one further test-offset the acceleration of the wind turbine; and
   determining a further compensation-offset based on the acceleration.

7. The method of claim 1, wherein applying the at least one test-offset comprises sequentially applying a plurality of test-offsets.

8. The method of claim 7, wherein each of the plurality of test-offsets comprises a blade test-offset for each of a plurality of blades of the wind rotor, wherein values of the blade test-offsets are permuted for different test-offsets and/or wherein signs of the values of the blade test-offsets are reversed for different test-offsets.

9. The method of claim 1, wherein each blade parameter comprises a blade balance mass of the respective blade.

10. The method of claim 1, wherein at least one test-offset comprises a blade pitch test-offset with an absolute value between 0.05 and 0.6 degrees.

11. The method of claim 1, wherein the acceleration comprises a fore-aft acceleration and/or a side-to-side acceleration of a tower of the wind turbine and/or of a nacelle of the wind turbine.

12. The method of claim 1, wherein the imbalance comprises an aerodynamical imbalance, which is compensated based on the fore-aft acceleration, and the imbalance comprises a mass imbalance, which is compensated based on the side-to-side acceleration.

13. The method of claim 1, wherein the compensation-offset is determined in dependence of a blade pitch angle of the wind rotor and/or of a blade loading of the wind rotor.

14. A wind turbine for generating electrical power, the wind turbine comprising
   a tower;
   a wind rotor, which is arranged at a top portion of the tower and which comprises at least one blade;
   an electrical machine configured as an electric generator, which is mechanically coupled with the wind rotor; and
   a control unit configured to carry out the method of claim 1.

\* \* \* \* \*